United States Patent Office 2,962,457
Patented Nov. 29, 1960

2,962,457
POLYTHIIRANE-RUBBER COMPOSITIONS

Herbert W. Mackinney, Freehold, N.J., assignor to Union Carbide Corporation, a corporation of New York No Drawing. Filed Apr. 15, 1958, Ser. No. 728,514

17 Claims. (Cl. 260—3)

This invention relates to polythiirane-rubber compositions. More particularly, this invention relates to polythiirane-rubber compositions which are particularly adaptable for use as adhesives in metal bonding.

Adhesive bonding of metal parts has assumed increased importance in recent years as such bonding is more simple, more direct, and greatly faster than the standard methods of riveting or welding. Adhesive bonding alleviates many obvious problems which arise with respect to riveting or welding of metal parts at high temperatures and/or high pressures.

Conventionally, adhesives which have been found suitable for use in bonding of metal parts are compositions combining a synthetic rubber with a thermosetting resin. Illustrative of such an adhesive composition is an acrylonitrile-butadiene rubber combined with a thermosetting phenolic resin. Another such system combines neoprene (polychloroprene) rubber with a p-tertiary butyl phenol resin.

The conventional adhesives, combining a rubber and thermosetting resin, have two serious limitations, however, which have negated their extensive use in the bonding of metal parts: (1) it is necessary to heat these compositions to a relatively high temperature in order to vulcanize them to insoluble, elastic products having good bonding strengths; (2) for maximum strength and serviceability these conventional compositions not only have to be vulcanized at relatively high temperatures, but also require the addition of reinforcing agents. Reinforcing agents are generally insoluble, inert materials having a large surface area to which the fluid parts of the rubber composition are absorbed, resulting in a more rigid rubber product having the necessary characteristics of strength as manifested by high bonding strength. Among the most common reinforcing agents can be mentioned carbon black, zinc oxide, silica, titanium dioxide and the like as well as resinous material such as lignin, styrene and phenolic resins.

High temperature vulcanization is highly undesirable as it not only excludes the adhesive union of heat-sensitive materials, but also renders difficult the adhesive union of very large articles which cannot be introduced into a furnace of normal size or of articles which are assembled out of doors.

Additions of reinforcing agents are particularly undesirable as they frequently require the use of blenders, mixers and other such apparatus in order to adequately disperse the reinforcing agent throughout the compositions, the blending operation adding to the time and cost of formulating the desired composition.

Prior efforts directed to alleviating the aforementioned problems by formulating a rubber composition which could be vulcanized, at relatively low temperatures, to an insoluble, elastic product having good bonding strength without the necessity of using two distinct systems in order to effect the vulcanizing and reinforcing actions have hitherto been unsuccessful.

I have now found, however, that by combining a polythiirane having more than one thiirane sulfur atom and a polymerization catalyst for the polythiirane with a natural or synthetic rubber, a composition is obtained which can be vulcanized at relatively low temperatures, generally below about 70° C. to an elastic product, insoluble in such solvents as benzene, having excellent bonding strength especially when used to bond together metal parts.

In addition, the compositions of this invention have a relatively long pot life, as compared to prior art adhesive compositions, which permits the compositions to be used under normal working conditions as they do not vulcanize to an unworkable product immediately upon formulation. Upon being vulcanized, however, the compositions, without any additions of reinforcing agents, remain highly elastic, become insoluble in aromatic hydrocarbon solvents, such as benzene, and have excellent bonding strengths when used to bond together metal parts as indicated by high test values obtained by subjecting the bonded metal parts to a so-called "Peel" test and also to a so-called "Breaking Load" test.

Generally, as little as 5 percent by weight of the polythiirane compound based on the weight of the rubber, in addition to the polymerization catalyst, is sufficient to vulcanize the rubber to an insoluble, elastic product having excellent physical properties. More than about 150 percent tends to decrease the elasticity of the rubber compositions. Particularly good results, however, have been achieved with about 25 to 50 percent by weight of polythiirane based on the weight of the rubber.

The exact formulation of the modified rubber compositions will depend upon the particular polythiirane employed, on the polymerization catalyst, and the type of rubber used.

Vulcanization is carried out by admixing at room temperature the polythiirane, polymerization catalyst, and rubber in mass or in solution, depending upon the reactivity and form of the thiirane. The liquid thiiranes can be used as such while the solid thiiranes are conveniently used in a solvent solution. The type of solvent used to put the solid thiiranes into solution are inert solvents such as the aromatic hydrocarbons and ketones, or mixtures thereof. Illustrative of suitable solvents are the following: benzene, toluene, 1,2-dimethyl benzene, 1,3-dimethyl benzene, 1,4-dimethyl benzene, methylethyl ketone, methyl isobutyl ketone and isophorone. The type of solvent is not critical as long as it does not interfere with the vulcanization reaction.

In the broadest sense, vulcanization is any treatment which maintains the elasticity of the rubber while decreasing its plasticity. Vulcanization is a chemical process in which a network of primary long chain rubber molecules are randomly interlocked by crosslinkages through a bridge such as a sulfur atom. Various physical and chemical changes take place with respect to the rubber upon vulcanization. The rubber experiences an increase in resilience, in abrasion resistance, and in the speed of deformation as well as an increase in the ultimate elongation, in the permanent set, and swelling capacity in solvents.

The polythiiranes of this invention are the sulfur anologues of polyepoxides containing more than one reactive epoxy group

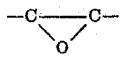

in their molecule, and are derived from both aliphatic and aromatic polyepoxides by reacting the epoxide with sulfur releasing agents in the manner described in this specification and as further explained in French Patent 797,621; Chemical Abstracts, volume 30, page 7122; Organic Synthesis, volume 32, page 39; and Journal of American Chemical Society, volume 75, page 4959.

Generally, the epoxy analogue of the polythiirane compound is mixed with a stoichiometric amount of a sulfur releasing compound, for instance thiourea, or a thiocyanate such as ammonium, potassium or sodium thiocyanate. For purpose of stoichiometric calculations one sulfur atom is considered to replace one oxygen atom. The pH of the mixture is adjusted to between about 5 to 7 and the mixture is allowed to react for a period of from 2 to 4 hours. The reaction mixture is then neutralized to a pH of between 7 and 8 and the product extracted with an appropriate solvent, for example an ether, ketone or alcohol. The product can be precipitated from the reaction mixture by the addition of a non-solvent such as water and purified either by distillation or crystallization. The completeness of the reaction is generally determined by a standard infra-red analysis which indicates the epoxy content of the reaction mixture.

The epoxides suitable for reaction with the sulfur releasing compounds for the preparation of the polythiiranes are those containing more than one reactive epoxy group

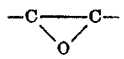

in their molecule, thereby having an epoxy equivalency of greater than one. The epoxides can be saturated, unsaturated, aliphatic, cyclo-aliphatic or aromatic and the epoxy may be present either as a terminal or interior group.

It is particularly preferred that the epoxides have only the elements hydrogen, oxygen and carbon in their molecule. Epoxides which can be used are the following: vinyl cyclohexene dioxide, epoxidized soybean oil, butadiene dioxide, glycidyl ether, 1,4-bis(epoxypropoxy)benzene, 1,3-bis(2,3-epoxypropoxy)cyclohexane, 4,4-bis(3,4-epoxybutoxy)diphenyl dimethyl methane, 1,3-bis(4,5-epoxypentoxy) 5-chlorobenzene, 1,3-bis(2-hydroxy-3,4-epoxybutoxy)benzene, 1,4 - bis(4,5 - epoxypentoxy)benzene, 1,2,5,6-diepoxy 3-hexyne, 1,2,5,6-diepoxyhexane, 1,2,3,4-tetra(3,4-epoxybutoxy)butane, diglycidyl ether of bis(4-hydroxyphenyl) propane, diglycidyl ether of bis (4-hydroxyphenyl)methane, diglycidyl esters of dicarboxylic acids such as diglycidyl ester of adipic acid, diglycidyl ester of phthalic acid; also diglycidyl ethers of ethylene glycol, propylene glycol; diglycidyl ethers of alkyl-substituted polyhydric alcohols such as methyl or ethyl substituted ethylene glycol, 4,5-epoxypentyl 4,5-epoxy-pentanoate, bis(2,3-epoxybutyl) ether, diethylene glycol bis(3,4-epoxycyclohexane) carboxylate; bis-(2,3-epoxy - 2 - methyl - propoxy)ethane, bis(2,3 - epoxy - 2 - methylpropyl)succinate, glycidyl ester of polyacrylic acid, phloroglucinol triglycidyl ether, triglycidyl ether of 1,1,3 tris(hydroxyphenyl)propane and the tetra glycidyl ether of 1,1,2,2 tetrakis(hydroxyphenyl)ethane.

It is generally believed that the replacement of the oxygen of an epoxide by sulfur results in a product which is conducive to greater reactivity. Consequently, the polythiiranes are readily polymerized under mild conditions of temperature by polymerization catalysts, illustrative of which are the primary and secondary amines, phenols, Friedel-Crafts reagents and non-oxidizing organic and inorganic acids having a dissociation constant greater than $1.0 \times 10^{-4}$. The presence of a polymerization catalyst is a prerequisite for the polymerization of the polythiiranes and the consequent curing of the rubber compound. Both of these reactions depend on the preliminary formation of an active group resulting from the opening of the thiirane rings of the polythiirane compounds which occurs only in the presence of a polymerization catalyst.

The opening of the thiirane ring results in the formation of a thiol group which in turn readily attacks another thiirane ring. This reaction initiates the polymerization of the polythirane with the subsequent formation of terminal thiol groups. The reaction to form thiol groups by the opening of the thiirane ring can occur at both ends of the polythiirane molecule. Each terminal thiol group of the growing polymer chain can react either with another polythiirane molecule or with the unreacted thiirane ring of another thiirane polymer chain. In the latter case, cross-linking of the polymer chains takes place.

Vulcanization of the rubber occurs by cross-linking of the thiol groups of the partially polymerized polythiirane with the double bonds of the rubber molecules. It must be emphasized that the polymerization of the polythiirane, cross-linking of the polythiirane and the vulcanization of the rubber are competing reactions and proceed simultaneously.

As previously stated, it is necessary to combine the polythiirane compound with a polymerization catalyst. Among the polymerization catalysts which have been found most suitable may be mentioned primary and secondary amines, Friedel-Crafts reagents, phenols and non-oxidizing organic and inorganic acids having a dissociation constant greater than $1 \times 10^{-4}$.

Illustrative of primary and secondary amines are the following compounds: methylamine, ethylamine, diethylamine, n-propylamine, di-n-propylamine, n-butylamine, n-amylamine, laurylamine, n-hexylamine, allyl amine, n-heptylamine, cyclopentylamine, ethylene diamine, diethylamino propyl amine, trimethylenediamine, tetramethylenediamine, pentamethylenediamine, hexamethyllenediamine, di(3-aminopropyl)ether, ethanolamine, diethanolamine, meta-xylylenediamine, aniline, methyl aniline, β-phenylethylamine, di-phenylethylamine, N-methylaniline, p,p-diamino diphenyl sulfone, methylenedianiline, p,p-diamino diphenylmethane, o-amino acetanilide, o-toluidine, 1,2,m-toluidine(1,3), p-toluidine(1,4), o-phenylene diamine(1,2), m-phenylenediamine(1,3), p-phenylenediamine(1,4) diethylenetriamine, o-anisidine (1,2), p-anisidine(1,4), p-phenetidine(1,4), o-chloroaniline(1,2), m-chloroaniline(1,3), p-chloroaniline(1,4), p-bromoaniline(1,4), 2,4,6-trichloroaniline, 2,4,6-tribromoaniline, diphenylamine, benzidine, o-toluidine, o-dianisidine. Also the polyamines, illustrated by the amines disclosed in patent application Serial No. 655,536, filed April 29, 1957, by A. K. Ingberman, said polyamines having the general formula R'NHR''(NHR)$_x$NH$_2$ wherein R is a divalent alkylene radical having the formula —C$_n$H$_{2n}$— wherein $n$ is an integer from 2 to 6 and R'' is an alkylene radical as defined for R or an arylene radical containing from 6 to 8 carbon atoms such as phenylene (—C$_6$H$_4$—) methylphenylene (—C$_6$H$_3$.CH$_3$—), dimethyl phenylene (—C$_6$H$_2$—(CH$_3$)—2—), xylylene (—CH$_2$C$_6$H$_4$—CH$_2$—)

and the like, R' is a monovalent radical selected from the group consisting of hydroxyalkyl and phenyl substituted hydroxylalkyl, $x$ is an integer from zero to three and with the provisos that when R' represents phenyl substituted hydroxyalkyl then R'' represents alkylene radical, and that when R'' represents an arylene radical, then R' represents hydroxyalkyl and $x$ is zero. Specific hydroxylated polyamines includes by the above formula are: N-(2-phenyl-2-hydroxyethyl)diethylenetriamine, N-(2-phenyl-2-hydroxyethyl) 1,2-diaminopropane, N-(2-phenyl-2-hydroxyethyl) dipropylenetriamine, N-hydroxyethyl m-xylene-diamine, N-hydroxyethyl m-phenylene diamine, N-hydroxypropyl m-phenylene diamine, and N-hydroxypropyl 2,5-toluene diamine.

Among the phenols which are suitable are the following: phenol, o-cresol, m-cresol, p-cresol, o-chlorphenol, m-chlorophenol, p-chlorophenol, p-bromophenol, 2,4,6 trichlorophenol, 2,4,6 tribromophenol, guaiacol, anol, eugenol, iso-eugenol, saligenin, carvacrol, thymol, o-hydroxy-acetophenone, p-hydroxyacetophenone, p-hydroxydiphenyl, o-hydroxydiphenyl, o-cyclohexylphenol, p-cyclohexylphenol; polyhydric phenols such as catechol, hydroquinone, hydroxyhydroquinone, phloroglucinol, resorcinol and pyrogallol; the di- or polynuclear phenols such as the bisphenols described in the Bender et al. United States Patent No. 2,506,486 and polyphenylols such as the novolak condensation of a phenol and a saturated or unsaturated aldehyde containing an average of from 3 to 20 or more phenylol groups per molecule (cf. book by T. S. Carswell entitled Phenoplasts, published in 1947 by Interscience Publishers of New York). Examples of suitable polyphenylols derived from a phenol and an unsaturated aldehyde such as acrolein, are the triphenylols, pentaphenylols and heptaphenylols described in application Serial No. 368,514, filed July 16, 1953, now U.S. Pat. No. 2,885,385, and copending application Serial No. 422,275, filed April 9, 1954, by A. G. Farnham now Patent 2,801,989.

The phenols may contain alkyl or aryl ring substituents or halogens, as exemplified by the alkyl resorcinols, the tribromo resorcinol and the diphenols containing alkyl and halogen substituents on the aromatic ring (Bender et al., U.S. Patent 2,506,486).

The polyhydric polynuclear phenols can consist of 2 or more phenols connected by such groups as methylene, alkylene, ether, ketone or sulfone. The connecting groups are further exemplified by the following compounds: bis(p-hydroxyphenyl) ether, bis(p-hydroxyphenyl)ketone, bis(p-hydroxyphenyl)methane, bis(p-hydroxyphenyl)dimethyl methane, bis(p-hydroxyphenyl)sulfone,
A trisphenol having the formula:

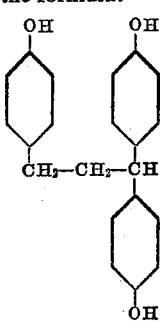

A tetraphenol having the formula:

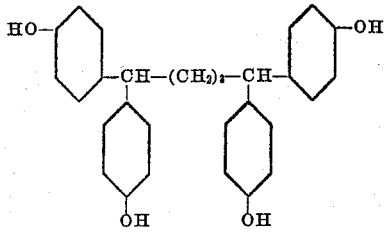

Illustrative of non-oxidizing acids having a dissociation constant of greater than $1 \times 10^{-4}$ which can be used as the polymerization catalysts for the polythiiranes may be mentioned: arsenic, bromacetic, brompropionic, chloracetic, chlorpropionic, dichloracetic, trichloracetic, fumaric, iodic, maleic, malonic, oxalic, phosphoric, phosphorous, phthalic, picric, pyrophosphoric, salicylic selenious, tartaric, tellurous, sulfuric, sulfurous and hydrochloric.

The Friedel-Crafts reagents are compounds, which according to the electronic theory of acids and bases, accept electrons. Examples of such compounds are metal halide Friedel-Crafts reagents, such as boron trifluoride, aluminum chloride, ferric chloride, zinc chloride and stannic chloride.

The various metal halides can also be employed in the form of complexes, such as etherates and amine complexes. Typical metal halide Lewis acid complexes are piperidine-boron-trifluoride, monoethyl amine boronfluoride, and boron-trifluoride-ether complexes. For a further explanation of electron acceptor compounds, reference is made to the article by G. N. Lewis, "Valence of Structures of Atoms and Molecules," Chemical Catalogue Company, 1923, which is herein incorporated by reference.

The polymerization catalysts are usually added in amounts ranging from about 0.5 to about 5 percent by weight based on the weight of the polythiirane. Adding more than about 5 percent does not appreciably increase the speed or degree of vulcanization and, therefore, is economically unattractive.

As will be appreciated from the following discussion and examples, a wide variety of rubbers, both natural and synthetic, can be vulcanized by the polythiiranes of this invention. Illustrative of such rubbers are the natural rubbers; balata, caoutchouc, caucho gutta percha, gutta-siak, juleting, kickxia, manihot, latex from the *Hevea brasiliensis;* synthetic diene polymers, such as homo polymers of hydrocarbons containing two unsaturated bonds such as butadiene-1,3; isoprene, 2,3-dimethyl butadiene-1,3 and the like, or copolymers of these with one or more copolymerizable mono-olefinic compounds. Copolymerizable mono-olefinic compounds are organic compounds which contain a single olefinic double bond: >C=C< and which are copolymerizable with butadiene-1,3 hydrocarbons. Such compounds are usually low molecular weight compounds of less than 10 carbon atoms which contain at least two hydrogen atoms and at least one radical other than hydrogen attached to the unsaturated double bond carbon atoms, as in the structure:

where at least one of the disconnected valences is attached to a group other than hydrogen, such as, chlorine, alkyl, alkoxy, acyl, cyano, or aryl.

Examples of such compounds include styrene, p-methyl styrene, alpha-methyl styrene, p-chloro styrene, vinyl naphthalene and similar aryl olefins and substituted aryl olefins; isobutylene and similar copolymerizable olefinic hydrocarbons; acrylic and substituted acrylic acids and their esters, nitriles and amides such as acrylic acid, acrylonitrile, methacrylonitrile, alpha-chloroacrylonitrile, methyl acrylate, methyl methacrylate, ethyl methacrylate, methyl alpha-chloro acrylate, acrylamide, methacrylamide and the like; vinyl methyl ketone, vinyl methyl ether, vinylidene chloride, N-vinyl carbazole, N-vinyl pyrrolidone and similar copolymerizable compounds containing a single olefinic double bond.

Any rubbery copolymer prepared by the copolymerization of a butadiene-1,3 hydrocarbon and a copolymerizable mono-olefinic compound can be vulcanized by the thiiranes of this invention. The rubbery copolymers which are ordinarily employed are copolymers of butadiene-1,3 with a lesser amount of styrene, acrylonitrile or an acrylic ester; or the copolymers of butadiene-1,3 and isobutylene. Such copolymers are known commercially under such names as "Ameripol," "Hycar," "Perbunan," "Buna S," "GR–S," "Chemigum," "Butyl," "Flexon."

Generally, in formulating the compositions of my invention, a fluid polythiirane is thoroughly admixed at room temperature with a mass of natural or synthetic unvulcanized rubber by any convenient method so that the rubber completely absorbs the thiirane. The treated rubber is then admixed with the polymerization catalyst, the mixture masticated and then passed through a 2-roll differential speed mill to further insure an adequate dispersion of the thiirane and catalyst throughout the rubber mass. The rubber composition is taken off the rolls in sheeted form and allowed to stand at room temperature for various periods of time ranging from a matter of minutes to a matter of hours, depending upon the specific formulation of the composition, whereby the rubber vulcanizes to a highly elastic product which is insoluble in an aromatic solvent such as benzene. Alternatively in cases where the polythiirane is a solid, the rubber mass, polythiirane, and polymerization catalyst are generally admixed and dissolved in a hydrocarbon solvent, such as benzene, methyl isobutyl ketone or a mixture of the two and the mixture stirred until the rubber separates out of solution.

In order to determine whether or not the rubber has vulcanized, a small amount of the treated rubber is added to a suitable quantity of benzene. Vulcanized rubber will swell in benzene but will not dissolve therein. Unvulcanized rubber will dissolve in benzene.

As a convenient method of determining the bonding strength of the vulcanized rubber composition, it is customary to prepare a rubber cement by admixing suitable amounts of unvulcanized rubber, polythiirane and polymerization catalyst in the presence of a hydrocarbon, such as benzene, to form a spreadable mixture. The cement is then applied to the metal surfaces to be joined and the metal parts are air dried at room temperature to allow the hydrocarbon to evaporate from the mixture. The coated metal surfaces are then pressed together and allowed to stand for about 24 hours under a pressure of 0.5 lb. per square inch; at the end of which time the rubber has vulcanized. The bonded metal parts are then subjected to the so-called "Mean Peel Load" test and also the "Breaking Load" test to determine the bonding strength of the vulcanized rubber composition.

If it is desired to speed the vulcanization of the rubber cement, moderate heat can be applied to the metal parts while they are under pressure, but such heat is not necessary.

In order to further illustrate this invention, a number of polythiiranes were prepared and used, in combination with polymerization catalysts to vulcanize rubber. The polythiiranes and their method of preparation are described below.

*Preparation of 4,5-epithio-pentyl 4,5-epithio-pentanoate*

$$CH_2\text{---}CH\text{---}CH_2\text{---}CH_2\text{---}C\text{---}O\text{---}CH_2\text{---}CH_2\text{---}CH_2\text{---}CH\text{---}CH_3$$
(with S bridges and C=O)

76 grams of thiourea were added to a glass flask containing 75 grams of 4,5-epoxy-pentyl 4,5-epoxy-pentanoate and 200 grams of dimethyl sulfoxide at 40° C. over a 90 minute period. During this time, the apparent pH of the reaction mixture was maintained at between 5 and 7 by the addition thereto of acetic acid. After two hours, the reacted mixture was diluted with 1200 ml. of water whereby the solution became turbid. The pH of the reacted mixture was then adjusted to 7.3 by adding more acetic acid, and 58 grams of a colorless liquid having an index of refraction at 25° C. of 1.5096 were extracted from the mixture by isopropyl ether. The extracted liquid was distilled under slightly reduced pressures at 100° C. whereby 10 grams of volatile material were distilled out, leaving behind a yellow viscous liquid. The yellow viscous liquid, 4,5-epithio-pentyl 4,5-epithio-pentanoate, contained 24.3% of sulfur and had a refractive index at 25° C. of 1.5042.

*Preparation of bis(2,3-epithiopropyl)ether of bis(4-hydroxyphenyl) dimethyl methane*

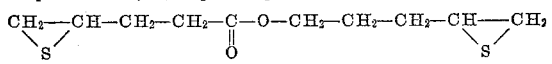

182 grams of diglycidyl ether of bis(4-hydroxyphenyl) dimethyl methane, 500 grams of methanol, 500 grams of dioxane and 15 drops of bromthymol blue were placed in a 2-liter, 2-necked flask fitted with a stainless steel stirrer, and a thermometer. The reactants were well agitated until the solution became clear. 152 grams of thiourea were then added in small portions, at intervals of 5 minutes, over a 1½ hour period. During this time, the temperature of the solution progressively rose from 21° C. to 40° C. and the solution became cloudy. The solution was then kept at 40° C. for 3 hours and constantly agitated. Thereafter, the solution was permitted to settle overnight and then was poured into 31 grams of water. A thick white emulsion formed which was transferred to a separatory funnel where a hard, crystalline product settled out. The crystals were dissolved in chloroform and the resulting solution washed twice with water. The solution was distilled under full water-pump vacuum, 20 mm. Hg. pressure, to a pot temperature of 40° C. whereby the chloroform was driven off. The residue was evaporated to dryness in a vacuum oven yielding crystals, which were dissolved in and later recrystallized out of heptane. The product consisting of white shiny crystals having a melting point of 90° C. was further purified by a standard chromatographic method. The product obtained, bis(2,3-epithio-propyl) ether of bis(4-hydroxyphenyl)dimethyl methane assayed for 17.07% sulfur theoretical sulfur content—17.2%).

*Preparation of bis(2,3-epithiobutyl)ether*

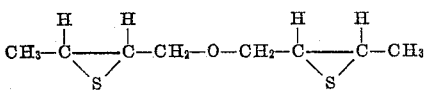

79 grams of bis(2,3-epoxybutyl)ether were added to a mixture of 80 grams of thiourea, 400 grams of methanol and 60 grams of glacial acetic acid. The mixture was allowed to react for four hours during which time the pH rose from 2.8 to 5.6. At the end of four hours, the solution was concentrated under reduced pressures of 2.5 mm. of mercury to one-half its volume and diluted with 900 ml. of water. The pH of the solution was then adjusted to 7.3 by the addition thereto of sodium bicarbonate and thereafter 58 grams of a colorless liquid were extracted with benzene. The benzene was removed from the extracted liquid under reduced pressures of 2.5 mm. of mercury and the remaining liquid was distilled at a temperature of 100° C. under a pressure of 0.4 mm. of Hg yielding a colorless distillate, bis(2,3-epithio-butyl) ether, having a boiling point of 100° C. (0.4 mm. Hg) a refractive index at 25° C. of 1.531 and a sulfur content of 32.3 percent (theoretical sulfur content—33.6%).

*Preparation of bis(2,3-epithiopropyl ether) of propylene glycol*

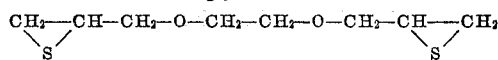

77.4 grams of diglycidyl ether of ethylene glycol were added to a mixture of 77 grams of thiourea, 400 grams of methanol and 0.6 grams of glacial acetic acid at 37° C. over a period of 70 minutes. During the addition, glacial acetic acid (amounting to a total of 17 grams) was added as required to maintain the mixture at a pH of between 6.5 and 7.0. After three and one-half hours the mixture was diluted with 890 ml. water whereupon the mixture separated into an oily phase and aqueous phase. The oily phase was extracted from the two phase mixture with toluene.

To the remaining aqueous layer there was added 60 grams of sodium bicarbonate raising the pH to 7.7. A white oil separated out of solution and was extracted with 200 ml. of toluene. The toluene was evaporated under reduced pressure of 25 mm. of Hg and at a temperature of 25–30° C. (vapor temperature) leaving behind 13.5 grams of a light yellow liquid, bis(2,3-epithiopropylether) of propylene glycol, having a sulfur content of 30.5% (theoretical sulfur content 31.0%).

The polythiiranes, prepared as described above, were used to illustrate this invention as shown by the following examples which are illustrative and not intended to limit the scope of this invention in any manner.

EXAMPLE I 26 parts by weight of a natural rubber prepared from the latex of the *Hevea brasiliensis*, processed by the B. F.

Goodrich Company and sold by that company under the designation Type 220 were admixed at room temperature with 22 parts by weight of 4,5-epithio-pentyl 4,5-epithiopentanoate whereby the rubber completely absorbed the thiirane. The rubber containing the thiirane was then mixed with 20 parts by weight of meta-xylylene diamine and the mixture masticated. The masticated mixture was then passed through a 2-roll differential speed mill, taken off in sheet form, and allowed to stand for three days. At the end of this time, a convenient sample of the rubber composition when added to benzene swelled, but did not dissolve therein indicating that the rubber had vulcanized. A sample of the same type rubber not containing the thiirane and diamine completely dissolved in benzene.

EXAMPLE II 10 parts by weight of a synthetic rubber, a copolymer of butadiene-1,3 and acrylonitrile containing about 65% by weight of butadiene-1,3 and 35% by weight of acrylonitrile and sold by the B. F. Goodrich Company under the trade name Hycar 1001, were admixed at room temperature with two parts by weight of bis(2,3-epithiopropyl) ether of bis(4-hydroxyphenyl) dimethyl methane and 0.2 parts by weight of diethyl aminopropyl amine in 80 parts by weight of a fifty-fifty mixture in parts by weight of xylylene and methyl isobutyl ketone. The mixture was stirred for 30 minutes at the end of which time the rubber separated out as a gel. The rubber gel did not dissolve in benzene, but merely swelled therein, indicating that the rubber had vulcanized. The same rubber not treated with the thiirane and amine completely dissolved in benzene.

EXAMPLE III 144 parts by weight of a 20 percent solution in methyl isobutyl ketone of a synthetic rubber, a copolymer of butadiene-1,3 and acrylonitrile containing about 75 percent by weight of butadiene-1,3 and 25 percent acrylonitrile and sold by the B. F. Goodrich Company under the trade name "Hycar 1432" were admixed at room temperature with three parts by weight of a boron trifluoride-ethyl ether complex containing 47% by weight of the boron trifluoride and with three parts by weight of bis-(2,3-epithiobutyl) ether. The mixture was allowed to stand for two hours whereupon at the end of this time, an elastic gel precipitated out of solution. The elastic or rubber gel did not dissolve in benzene but merely swelled therein, indicaitng that the rubber had vulcanized. The same rubber not combined with the thiirane and boron trifluoride completely dissolved in benzene.

EXAMPLE IV 26 parts by weight of a natural rubber prepared and processed by the B. F. Goodrich Company from the latex of the *Hevea brasiliensis*, sold by that company under the designation Type 220 were admixed with 22 parts by weight of 2,3-epithio-ether of ethylene glycol whereby the rubber completely absorbed the thiirane. The rubber containing the thiirane was then admixed with 20 parts by weight of metaxylylene diamine and the mixture thoroughly masticated. The masticated rubber composition was then passed through a two roll differential speed mill, taken off the mill in the form of a sheet and allowed to stand in sheeted form at room temperature for three days. At the end of three days, the rubber composition swelled in benzene but did not dissolve therein indicating that the rubber had vulcanized. The same type of rubber but not in combination with the thiirane and diamine completely dissolved in benzene.

To illustrate the excellent bonding strength of the rubber compositions of this invention, a rubber cement, prepared from the rubber compositions of this invention, was used to bond together metal surfaces. The actual composition of the cement and the bonding strength possessed by the cement is detailed in the following example:

EXAMPLE V 4 grams of Hycar 1432, an acrylonitrile-butadiene rubber, 2.5 grams of bis(2,3-epithio butyl)ether of bis(4-hydroxyphenyl) dimethyl methane, 0.75 gram of diethyl aminopropylamine (a polymerization catalyst), were admixed in a mixture of 20 grams of methyl isobutyl ketone and 4.5 grams of benzene. The resultant mixture was adequately stirred to form a spreadable cement. This cement was then thinly spread on the faces of two pieces of clean copper foil (2 mil foil). The coated copper foil pieces were air dried at room temperature for 15 minutes whereby the volatile, benzene and methyl isobutyl ketone evaporated. The coated foil pieces were then clamped together, face to face, and maintained under a pressure of 0.5 lb. per square inch for 24 hours. At the end of 24 hours, the metal pieces bonded together by the vulcanized rubber composition were subjected to a test to determine the bonding strength of the rubber composition. The test and test value obtained are noted below.

Test: Value
    Mean peel load (ASTM-816) __ 7.6 lbs./inch width

To further indicate the excellent bonding strength of the rubber compositions of this invention, a rubber cement was prepared and tested in the same manner described in Example V with the exception that no thiirane and polymerization catalyst were used in the cement formulation. The Mean Peel Load value obtained with this cement was 2.5 lbs./inch width which is substantially lower than the value obtained using the rubber compositions of this invention.

It is worth noting that the highest mean peel load values reported by the B. F. Goodrich Company on their booklet "Cements" (1952) is 7.5 lbs./inch width for a hot bonded cement.

EXAMPLE VI

A rubber cement containing a polythiirane and polymerization catalyst whose formulation and method of preparation are described in Example V of this specification was applied to the surfaces of two aluminum foil pieces having a width of 1/16 of an inch. The coated aluminum foil pieces were air dried to room temperature for 15 minutes whereby the benzene and methyl isobutyl ketone evaporated. The coated aluminum foil pieces were lapped over to form a lap joint and clamped tightly together under a pressure of 0.5 lb. per square inch. The clamped aluminum pieces were allowed to stand for 45 hours after which time they were removed from between the clamps and allowed to stand for 11 days. The aluminum foil pieces which were bonded together by the vulcanized rubber, were then subjected to a "Breaking Load" test which also indicates the relative bonding strength of the rubber composition.

Test: Value
    Breaking load (ASTM-D-1002) _____ 75 lbs.

A cement prepared and tested in the same manner as described in Example VI with the exception that no polythiirane and polymerization catalyst were used in the cement formulation had a breaking load value of only 4 lbs.

Any of the usual pigments, fillers, antioxidants and the like, can be present in the composition without affecting its superior properties.

What is claimed is:

1. A vulcanizable composition comprising a vulcanizable rubber selected from the group consisting of natural rubbers and synthetic diene polymers, a polythiirane having more than one

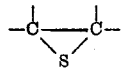

group per molecule and a thiirane ring-opening polymerization catalyst selected from the group consisting of primary amines, secondary amines, phenols, Friedel-Crafts reagents and non-oxidizing acids having a dissociation constant of greater than about $1 \times 10^{-4}$, said polythiirane and catalyst being present in an amount sufficient to vulcanize the said rubber.

2. A composition as defined in claim 1 wherein the polythiirane is 4,5-epithio-pentyl 4,5-epithio pentanoate.

3. A composition as defined in claim 1 wherein the polythiirane is bis(2,3-epithio propyl) ether of bis(4-hydroxyphenyl) dimethyl methane.

4. A composition as defined in claim 1 wherein the polythiirane is bis(2,3-epithiobutyl) ether.

5. A composition as defined in claim 1 wherein the polythiirane is bis(2,3-epithiopropyl) of propylene glycol.

6. A composition as defined in claim 1 wherein the polymerization catalyst is meta-xylylene diamine.

7. A composition as defined in claim 1 wherein the polymerization catalyst is diethyl amino-propyl amine.

8. A composition as defined in claim 1 wherein the polymerization catalyst is a boron trifluoride-diethyl ether complex.

9. A vulcanizable composition comprising a vulcanizable rubber selected from the group consisting of natural rubbers and synthetic diene polymers, a polythiirane having more than one

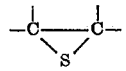

group per molecule and a primary amine, said polythiirane and amine being present in an amount sufficient to vulcanize the said rubber.

10. A vulcanizable composition comprising a vulcanizable rubber selected from the group consisting of natural rubbers and synthetic diene polymers, a polythiirane having more than one

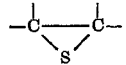

group per molecule and a phenol, said polythiirane and phenol being present in an amount sufficient to vulcanize the said rubber.

11. A vulcanizable composition comprising a vulcanizable rubber selected from the group consisting of natural rubbers and synthetic diene polymers, a polythiirane having more than one

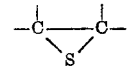

group per molecule, and a Friedel-Crafts reagent, said polythiirane and Friedel-Crafts reagent being present in an amount sufficient to vulcanize the said rubber.

12. A vulcanizable composition comprising a vulcanizable rubber selected from the group consisting of natural rubbers and synthetic diene polymers, a polythiirane having more than one

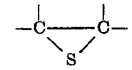

group per molecule and a non-oxidizing acid having a dissociation constant greater than about $1 \times 10^{-4}$, said polythiirane and acid being present in an amount sufficient to vulcanize the said rubber.

13. A vulcanized composition as defined in claim 1.
14. A vulcanized composition as defined in claim 9.
15. A vulcanized composition as defined in claim 10.
16. A vulcanized composition as defined in claim 11.
17. A vulcanized composition as defined in claim 12.

References Cited in the file of this patent

UNITED STATES PATENTS

| | | |
|---|---|---|
| 2,040,698 | Lewis et al. | May 12, 1936 |
| 2,094,914 | Dachlauer et al. | Oct. 5, 1937 |
| 2,235,621 | Patrick | Mar. 18, 1941 |